United States Patent [19]

Perkins

[11] Patent Number: 5,646,370

[45] Date of Patent: Jul. 8, 1997

[54] PERMANENT ATTACHMENT OF GROUNDING WIRE

[75] Inventor: Douglas S. Perkins, Austin, Tex.

[73] Assignee: Minnesota Mining and Manufacturing Company, Saint Paul, Minn.

[21] Appl. No.: 431,111

[22] Filed: Apr. 28, 1995

[51] Int. Cl.$^6$ .............................................. H02G 15/103
[52] U.S. Cl. ........................ 174/51; 174/73.1; 174/78
[58] Field of Search .............................. 174/78, 73.1, 51; 439/98, 99, 92

[56] References Cited

U.S. PATENT DOCUMENTS

| | | | |
|---|---|---|---|
| 3,771,112 | 11/1973 | Thompson et al. | 339/244 |
| 3,777,050 | 12/1973 | Silva | 174/78 |
| 3,808,353 | 4/1974 | Burtelson | 174/78 |
| 4,383,131 | 5/1983 | Clabburn | 174/73.1 |
| 4,628,150 | 12/1986 | Luc | 174/78 |
| 4,696,649 | 9/1987 | Smorzaniuk et al. | 439/98 |
| 4,973,259 | 11/1990 | Sachs | 439/98 |
| 5,028,742 | 7/1991 | Redman | 174/78 |
| 5,151,053 | 9/1992 | Shinji et al. | 439/616 |
| 5,315,063 | 5/1994 | Auclair | 174/78 |

*Primary Examiner*—Kristine L. Kincaid
*Assistant Examiner*—Marc D. Machtinger
*Attorney, Agent, or Firm*—Gary L. Griswold; Walter N. Kirn; Matthew B. McNutt

[57] ABSTRACT

A ground strap and ground wire assembly for high voltage electrical connection and termination devices includes a braided copper strap and solid copper wire connected to each other by brazing or soldering rather than the conventional compression connector.

3 Claims, 2 Drawing Sheets

5,646,370

PERMANENT ATTACHMENT OF GROUNDING WIRE

FIELD OF THE INVENTION

The present invention relates generally to devices for connecting and terminating shielded high voltage power cables, and, more particularly, to grounding assemblies for such connecting and terminating devices.

BACKGROUND OF THE INVENTION

In recent years, heavy emphasis has been placed upon the development of underground electrical power distribution systems, especially in light industrial, commercial and residential areas. Various power distribution components, such as shielded electrical cables, transformers and electrical connectors have been evolved for use in such systems.

Among these components, shielded electrical connectors and terminators have been developed which are readily assembled in the field at the terminal ends of shielded electric cables so as to facilitate the construction and installation of underground power distribution systems.

In installations where the shielded high voltage power cables are of the type having a central conductor surrounded by an insulator which is, in turn, surrounded by a shielding system including a metallic tape shield, a wire shield or other proprietary shielding systems, it is often necessary to connect the shield to ground at prescribed locations, and especially adjacent the terminal ends of the cables where connectors or terminators are to be installed. It is also necessary to ground the component itself so as to prevent the build up of charges on its surface. It would be advantageous to have available a grounding device which would enable effective connections of such a shield to ground and the exterior of the component to be accomplished with an ease of assembly similar to that enjoyed by the currently available components described above.

SUMMARY OF THE INVENTION

It is therefore an important aspect of the present invention to provide a shield grounding device which will effectively ground the metallic shield of a high voltage power cable.

Another aspect of the invention is the provision of a grounding device of the type described above which is fabricated entirely in the factory and is easily installed in the field without connectors or without complex taping.

These desirable aspects of the invention are accomplished by providing a braided copper ground strap having an integral ground wire attached to the ground strap by soldering or brazing at the place of manufacture.

BRIEF DESCRIPTION OF THE DRAWINGS

The present invention will be described with respect to the accompanying drawings, wherein like numbers refer to like parts in the several views, and wherein.

DESCRIPTION OF THE PREFERRED EMBODIMENT

Figure 1:
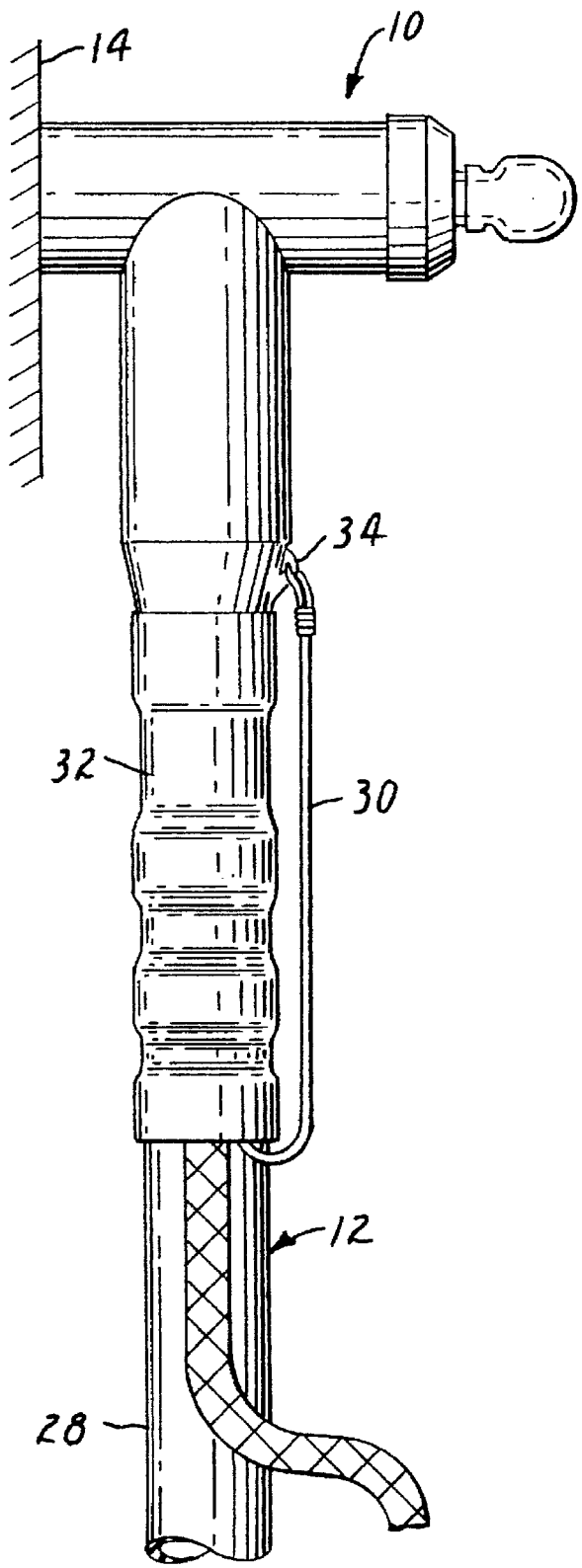
FIG. 1 is a side view of an elbow adaptor for termination of an electrical connector.

FIG. 1 illustrates a connection adaptor, generally indicated as 10, which is one of many types used to terminate or connect an electrical cable 12 to another cable or, in this case, an electrical device such as a transformer 14 or the like. The particular adaptor 10 of FIG. 1 is an elbow adaptor since it connects to the transformer 14 at an angle of 90° to the direction of approach of the cable 12. Many other types of adaptors such as tee types or straight adaptors are included within the scope of this invention.

Figure 2:
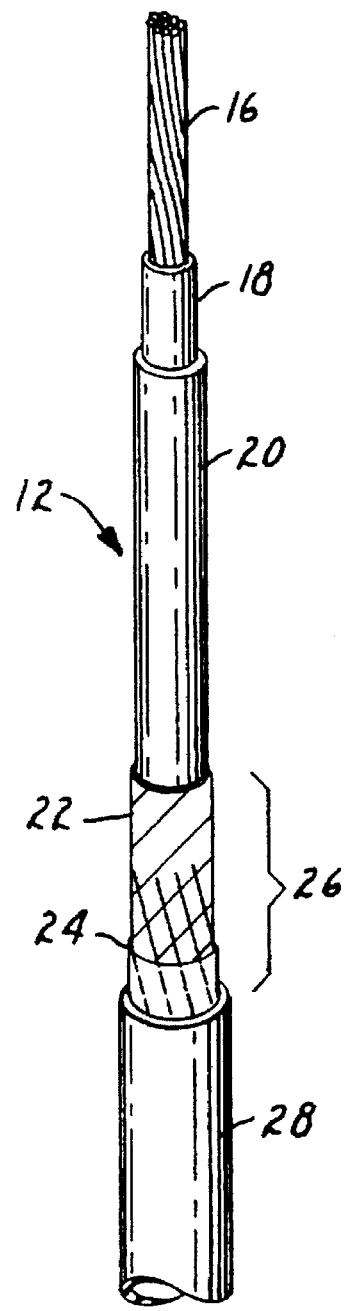
FIG. 2 is a shielded power cable prepared for attachment to the adaptor of FIG. 1.

As shown in FIG. 2, the cable 12 includes a central conductor 16 surrounded by a semi-conductive strand shield 18, insulation 20, a semi-conductive polymeric shield 22, metal wires or tape 24 which together with the polymeric shield 22 constitute a cable ground shield 26, and jacket 28 as an outer layer to protect the conductor from the environment. Other cable constructions exist, but all include a ground shield which requires connection as described herein.

Returning to FIG. 1, it is necessary to connect the outer shell of the adaptor 10 to the cable shield 26 and to provide for continuity of the cable shield 26 by connecting the same to the ground shield of another cable or a grounded portion of a device to which the cable is connected.

The ground connection of the outer surface of the adaptor to the cable ground shield 26 is accomplished by a metal ground wire 30, typically number 14 AWG (American Wire Gauge) copper wire, which extends from under an elastomeric covering 32 disposed over the bared ground shield 26 of the cable 12. The end of the ground wire 30 is threaded through a grounding eye 34 and twisted upon itself to secure the ground wire 30 to the adaptor.

Figure 3:
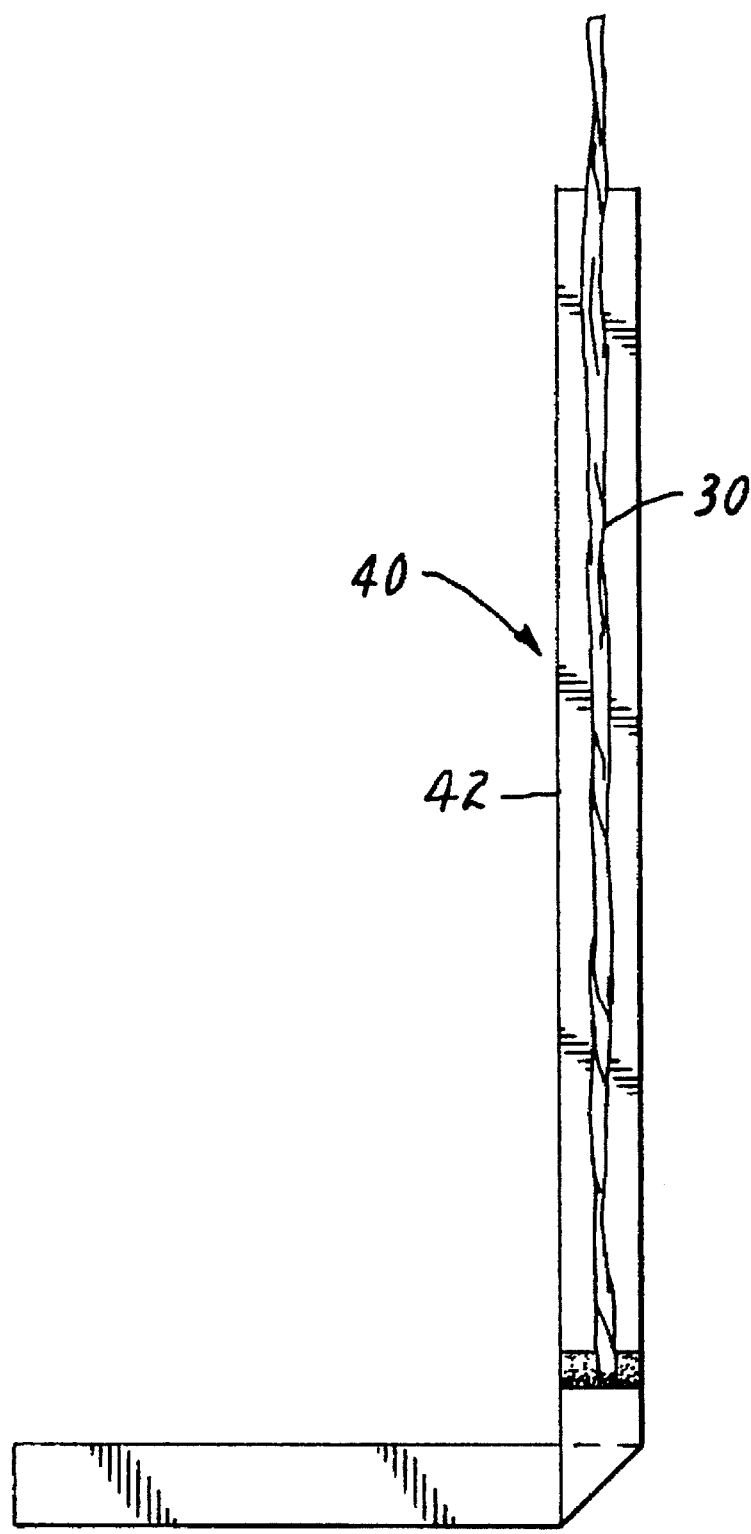
FIG. 3 is a grounding assembly for attachment to the cable of FIG. 2.

Electrical continuity of the cable shield 26 and connection of the ground wire to the cable shield 26 is accomplished by means of a grounding assembly 40 illustrated in FIG. 3. The grounding assembly includes a flexible metal ground strap 42 which may be a thin sheet of a metal such as copper, aluminum or alloys of either, but preferably is a flat, tinned, copper braid. The particular braid preferred is made of 884 strands of number 36 AWG (American Wire Gauge) strands of copper arranged in 48 bundles of 18 strands per bundle. Its length is approximately 810 mm, its width approximately 16 mm and its thickness approximately 1.3 mm.

Attached to the ground strap 42 is the ground wire 30 by means of soldering, if low-melting-temperature alloy such as a tin-lead alloy is used, or brazing, if high-melting-temperature alloy such as a copper-zinc alloy is used. The ground strap 42 is attached to the cable shield 26 by wrapping the ground strap 42 around the exposed cable shield 26 and securing the wrapped strap 42 with a spiral, constant-force spring (not shown) over the strap 42. The elastomeric cover is then added over the cable ground shield 26 area.

The ground strap 42 is provided with a 90° fold so that the unwrapped portion of the strap 42 and the attached ground wire 30 may extend along the length of the cable 12 and exit the elastomeric cover 32. As noted earlier, the ground wire 30 extends for electrical connection to the exterior of the adaptor shell.

In the past, a braided ground strap and ground wire such as illustrated here were provided to field personnel for connection to each other when the adaptor was to be assembled to the cable. It was required that the ground wire be connected to the strap by a compression connector. By providing a ground wire 30 which is previously assembled to the ground strap 42 at the factory, this assembly step by field personnel is eliminated and a solid electrical and mechanical connection between the strap 42 and the wire 30 is assured.

Thus there has been described a ground strap and ground wire assembly according to the present invention which may be preassembled and will be consistent in quality. Of course, many modifications will be apparent to those skilled in the art. For example, the ground strap 42 may be a sheet rather than the preferred braid, and many variations in the dimensions given for illustrative purposes may be assumed without impairing its efficiency. Likewise, the ground wire 30 may assume any cross-sectional shape, so long as it possesses the required mechanical strength and electrical current-carrying ability.

The invention claimed is:

1. A ground connection kit for use with an adapter terminating an electrical cable including a conductor, insulation covering the conductor and a ground shield surrounding the insulation, the kit comprising:

a flexible, metal grounding strap adapted to be connected to the ground shield and extending along the cable for connection to a ground plane;

a ground wire soldered or brazed to said grounding strap and extending along the cable, said ground wire adapted to be attached to the exterior of said adapter for electrically grounding said adapter to the shield of the cable; and an elastomeric cover for placement over the grounding strap and ground wire and in contact with the cable to protect the ground shield from contaminants and electrically insulate the ground shield;

wherein the grounding strap and the ground wire exit an end of the cover for connection to the ground plane and adapter, respectively.

2. A ground connection kit according to claim 1 wherein said grounding strap is copper braid.

3. A ground connection kit according to claim 2 wherein said copper braid is tinned.

* * * * *